United States Patent

Leprince et al.

[11] Patent Number: 5,911,074
[45] Date of Patent: Jun. 8, 1999

[54] PROCESS FOR MANIPULATING DATA MODELS USED IN SOFTWARE ENGINEERING

[75] Inventors: Elisabeth Leprince, Paris, France; Robert Carosso, Chelmsford, Mass.; James Kiso, Acton, Mass.; Edward Strassberger, Billerica, Mass.

[73] Assignee: Bull S.A., Louveciennes, France

[21] Appl. No.: 08/761,202

[22] Filed: Dec. 6, 1996

[30] Foreign Application Priority Data

Dec. 8, 1995 [FR] France ................................ 95 14576

[51] Int. Cl.$^6$ ........................................................ G06F 9/45
[52] U.S. Cl. ............................................. 395/703; 395/701
[58] Field of Search ............................. 395/200.76, 681, 395/683, 701, 703, 707; 380/4; 345/335

[56] References Cited

U.S. PATENT DOCUMENTS

| | | | |
|---|---|---|---|
| 5,339,434 | 8/1994 | Rusis | 395/200.76 |
| 5,627,979 | 5/1997 | Chang et al. | 345/335 |
| 5,689,709 | 11/1997 | Corbett et al. | 395/683 |
| 5,692,047 | 11/1997 | McManis | 380/4 |
| 5,701,483 | 12/1997 | Pun | 395/681 |

FOREIGN PATENT DOCUMENTS 495279  7/1992  European Pat. Off. .

OTHER PUBLICATIONS

Koschmann T et al "Bridging the gap between object–oriented and logic programming"; p. 37, left col., line 22—middle col., line 1; p. 38, middle col., line 3—right col., line 5; p. 38, right col., line 27—p. 39, left col., line 9.

*Primary Examiner*—James P. Trammell
*Assistant Examiner*—Matthew Smithers
*Attorney, Agent, or Firm*—Edward J. Kondracki; Kerkam, Stowell, Kondracki & Clarke, P.C.

[57] ABSTRACT

The present invention relates to a process for manipulating data models for the transfer of models between a plurality of software engineering tools (Ta, Tb, Tc, Td, etc.) and for the application of transformation rules to a model, wherein the transformation of data models is carried out by means of gateways (Ba, Bb, Bc, Bd, etc.) which make it possible to convert the format of one tool to the format of another tool by passing through a unique neutral intermediate format (NIM). The present process is remarkable in that the development of the gateways, in accordance with the so-called object-oriented approach, is carried out in an executed language, the gateways being executables which allow the transformation of a data model in several steps activated successively, in a systematic or conditional way, by means of a command language which describes a logic for dynamic concatenation of the steps, concatenation being a named, parameterized procedure. Each step is an executable whose code is developed from an array of reusable classes, while the activation of a procedure requires simply that the name and the parameters of the corresponding procedure be supplied.

12 Claims, 2 Drawing Sheets

FIG. 1

FIG_2

PROCESS FOR MANIPULATING DATA MODELS USED IN SOFTWARE ENGINEERING

BACKGROUND OF THE INVENTION

The present invention relates to a process for manipulating data models for the transfer of these data models among a plurality of software engineering tools and the application of transformation rules to a model, wherein the data models are transformed by means of gateways which make it possible to convert the format of one tool into the format of another tool by passing through a unique neutral intermediate format.

FIELD OF THE INVENTION

Generally, the basic desire common to users or designers is to seek interoperability between software tools so that it is possible to exchange, in the form of data models, information relative to the development of applications among heterogeneous development tools used in their own environments. In particular, the transfer of data models can be a valuable aid for enabling, for example, the migration of applications among software engineering tools or between an existing software engineering tool and a new development tool for a client/server model, or the management of development information, in the form of data models, for example in what is known to one skilled in the art as a "repository." With the utilization of such tools being more and more common, it can be desirable to manage, import or transfer export files from one or more of the software engineering tools on the market, thus making it possible to design or analyze information models. However, in the current state of the art, various drawbacks arise. In effect, each tool has its own internal formalism and a private or specific way of representing objects, storing information, etc., so that two tools cannot communicate or exchange information directly.

The solution used most recently to avoid these drawbacks consisted of developing for each tool, and from tool to tool, what are known to one skilled in the art as "gateways", that is, interfaces whose role is to make it possible to convert the format of one tool into the format of another tool. Thus, in order to allow a dialogue between tools, it was necessary to develop for each tool a number of gateways equal to the number of tools with which it was desirable to communicate, and when a new tool appeared, it was necessary to develop for each tool a specific gateway for allowing a dialogue with the new tool. Obviously, this solution has the chief drawback of requiring the creation of as many gateways as there are possible tool combinations, which quickly becomes prohibitive in terms of cost and development time. This is true even when dealing with a relatively limited number of tools. For example, in order to allow a dialogue between 4, 5 or 6 tools, respectively, it would be necessary to develop 6, 10 or 15 gateways, respectively.

In order to eliminate this drawback, at least partially, a solution was conceived which consisted of developing gateways which were just as specific, but designed to make it possible to convert the format of one tool into the format of another tool by passing through a common intermediate format which is neutral, and therefore unique, creating a neutral hub information model which serves as an exchange kernel. This concept of neutral representation using this hub information model, in which all the gateways pass through this exchange kernel, makes it possible to reduce the number of gateways significantly, particularly when the number of tools to be connected is large. Thus, using the preceding example, in order to allow a dialogue between 4, 5 or 6 tools, respectively, it would only be necessary in this case to develop 4, 5 or 6 gateways, respectively, or one gateway per tool for accessing the exchange kernel and converting the format of the tool into the common intermediate format. With this type of solution, a proprietary approach providing easy portability was selected. This approach provides the portability from specific written and interpreted languages that were developed. The languages were compact, easily controlled and functionally customized were developed to fulfill this functionality. In effect, porting is simplified significantly in this closed world, since only one program has to be interpreted. However, this solution, although advantageous, also has its drawbacks. A first drawback is inherent in the fact that an interpreted language is not very fast, since the interpreter must analyze this language in order to be able to execute the actions described. A second important drawback in using a proprietary language of this type is that it does not make it possible to apply the concept of reusable components. In effect, when it is desirable to develop a new gateway, it is necessary to rewrite the entire code in this specific language. Moreover, such languages generally suffer from a poor development environment (no libraries of reusable functions, no debugging tool or "debugger," etc.).

SUMMARY OF THE INVENTION

The object of the present invention is to eliminate the various drawbacks of the different known methods of the prior art and to provide a process for manipulating data models which, by virtue of the judicious choice of language used, offers substantial flexibility and great speed of execution, is easily expandable and makes it possible to apply the concept of reusable components, while offering a high level of portability and performance and a low cost.

To this end, the process for manipulating data models mentioned in the preamble is remarkable in that the development of the gateways, in accordance with the so-called object-oriented approach, is carried out in an executed language, the gateways being executables which allow the transformation of a data model in several steps activated successively, in a systematic or conditional way, by means of a command language which describes a logic for dynamic concatenation of the steps, concatenation being a named, parameterized procedure, each step being an executable whose code is developed from an array of reusable classes, and the activation of a procedure requiring simply that the name and the parameters of the corresponding procedure be supplied.

Thus, according to the concept of the invention, it was decided to use an executed language, adopting an object-oriented approach in spite of unfavorable preconceptions by light of which proprietary languages developed in a specific way were considered to authorize easy portability and to favor the strict functional adaptation deemed necessary. Contrary to this preconception and to the known approaches of the prior art, it was decided to use a known standard language which was more flexible, preferably compiled directly, whose memory management is more precise and more efficient, such as the language C++, for example. Moreover, a language of this type has a very high level of abstraction and, when used with adequate libraries, makes it possible to increase efficiency and speed, and to provide an advantageous genericity, since the same structure can be reused in different contexts, thus favoring the reusability and compatibility factors. Another advantage is that this type of language can be easily debugged by means of a corresponding debugger, making it possible to further reduce the development time for the gateways. Finally, the choice of a standard language for which a large number of products and users exists cannot help but ensure a quality environment.

Thus, in order to execute transfers from one tool to another or from one model to another, there are several existing components designed to allow the execution of the code of a gateway, and each gateway is in fact developed like an object-oriented program constructed with the aid of libraries of reusable classes. These classes are used to develop different gateways, bearing in mind a gateway can be constructed in several phases, for example, a phase for physically decoding the files through recognition of the codes and thus of the syntactic elements in the import file, followed by a phase for coding the transformation, in which the elements corresponding to the syntactic elements in the neutral information model are found or created, and possibly also an integrity checking phase. Each of these phases constitutes a reusable module, and all of the modules can be dynamically concatenated, not like a program but according to a sequence of procedures to be applied. For this purpose, the list of the modules to be dynamically concatenated is described with the aid of what is known to one skilled in the art as an "operation definition file", while what is known to one skilled in the art as a "task manager" searches for the modules among the executables containing the reusable procedures in order to execute them and thereby construct the gateway, taking into account the configuration parameters for the adaptation of this gateway. All this information can be stored in a persistent space, for example a disk, while the intermediate results are held temporarily in memory. Furthermore, the task manager also makes it possible to select the optimal execution order when more than one appropriate procedure and/or executable exist simultaneously. In fact, for example, several copies of different procedures may be available, in which case the task manager automatically selects the sequence of modules and the procedure class which minimizes the loading of the executables, making it possible to optimize the execution time.

The process for manipulating data models therefore activates reusable components, making it possible to develop gateways rapidly. Remarkably, in order to develop a gateway, a reusable class is created which makes it possible to represent the models and metamodels stored in memory in a repository or in an external file by using a dynamic allocation of modeling objects, the objects in this class integrating an array of memory structures and supplying functions for manipulating the data of a model loaded into memory.

Generally, the data can be stored in different forms, formats and locations. Preferably, in order to simplify the manipulations, the following mechanisms are preferred:

a mechanism which makes it possible to read, write and analyze the tool export files, which are user data files generated by a tool in a proprietary format, mechanisms which correspond to objects, for example C++ objects, each of which encapsulates or integrates an array of memory structures and supplies functions for manipulating data models loaded from tool export files and/or from a repository, the use of these objects and the functions for manipulating these objects constituting a reusable class. Preferably, the organization of the data in a model is based on a metamodel loaded at the moment these classes are created, the metamodels being loaded at the moment of execution from text files known as metamodel files. A class of this type can be loaded with a tool metamodel or can be loaded with a metamodel of the neutral information model, since both types of objects are used during the execution of the gateway, a mechanism called a neutral data file, which is a text file containing data which have been mapped with data in the neutral information model, which mechanism is used for the transfer of data between different executables or for permanent storage on a disk, a repository in which a user's data can be stored using schemas which represent the neutral information model and can be generated by tools of the repository (for example, management of versions, requests, etc.).

Thus, with the gateways, the data can be moved and manipulated from one location or storage mechanism to another and/or from one form to another. Three examples of gateways may be given: import, export or transfer gateways. The use of an import gateway makes it possible to extract data from an export file of a tool in order to place them in the repository, while the use of an export gateway makes it possible to extract data from the repository in order to create a tool export file. The use of a transfer gateway makes it possible to import data directly from one tool export file to another without passing through storage in the repository. Of course, there are other types of operations in which the object is not necessarily to move or to code the data, but which make it possible to process the data loaded into memory at a given instant. All these operations require the capability to load data into memory, to manipulate and to write the data while storing them in a persistent way, which operations are feasible due to the existence of the reusable classes and the functions claimed herein. A certain number of operations require the creation of multiple objects and involve conversions or codings between various objects. For example, when data are extracted from a tool export file, an executable makes it possible to analyze this file syntactically and to create an object which contains the data in the export file, but structured so as to correspond to the metamodel of the tool. Next, the data specific to the tool are converted into general data according to the neutral information model, which involves the conversion of this object into an object which corresponds to the neutral information model. The data stored in this way can be processed and eventually saved in a neutral data file (if the data must be communicated to another executable) or stored in the repository.

Consequently, the gateways make it possible to access the data models and the definitions of metamodels stored in memory, the objects of the models being dynamically allocated in memory. After the loading of the metamodel, a model is constructed using the template of the metamodel. The model arrays have a structure similar to that of the metamodel arrays, which allows rapid mapping between objects and between definitions of the properties and their instances.

Equally characteristically, in order to develop a gateway, a reusable class is created which makes it possible to code and decode different tool export file formats, which class encapsulates the tool export records and is used to describe the record formats of an import file, whereas upon initialization, while the metamodel of a tool is read from a text file with the aid of the class for representing the models and metamodels stored in memory, the code of the gateway makes it possible to read the tool export file, to access the member fields of the records and to create the objects and their properties using the functions of the class for representing the models and metamodels stored in memory.

In effect, the programming languages, including the language C++, do not make it possible to directly manipulate structures containing several variable fields. The solution proposed herein is to use record declarations in the form of a series of field descriptors. The programmer defines fixed and variable field sizes, record-type codes with constants for values, and separator values. In the processing code, the programmer first calls functions which make it possible to map a record with its descriptor, then accesses the fields of the record. In order to create a record of the export file, the programmer fills the member fields of this record from the data of the module, then writes the record in its entirety. The description of the record comprises, for each field, the name, type and size of the information at the moment of execution. The description information, like the data, can be displayed for debugging.

This class as claimed makes it possible to define macros for the construction of record descriptors and function prototypes for mapping a register with a record description, by supplying data from a field in a record, setting data in a record field and supplying a complete record for the extraction.

Thus, this reusable class advantageously makes it possible to perform different operations on different tool export files, which files are read and written by means of components of the gateway.

Finally, and equally remarkably, in order to develop a gateway, a reusable class is created for manipulating character strings, making it possible to handle the allocations, the concatenations and the comparison operators with the substring and dynamic memory reallocation functions, while preserving compatibility with the character strings of a c-type language.

Thus, this reusable class provides a practical technical solution by offering a type of data specific to character strings, which has a behavior comparable to that of the predefined data types in C language. This class has another characteristic of great importance, in that it makes it possible to prevent any loss of information generally associated with losses of storage blocks.

BRIEF DESCRIPTION OF THE DRAWINGS

The following description in reference to the appended drawings, given as a non-limiting example, will make it easy to understand how and in what environment the invention can be implemented.

DESCRIPTION OF THE PREFERRED EMBODIMENTS

Figure 1:
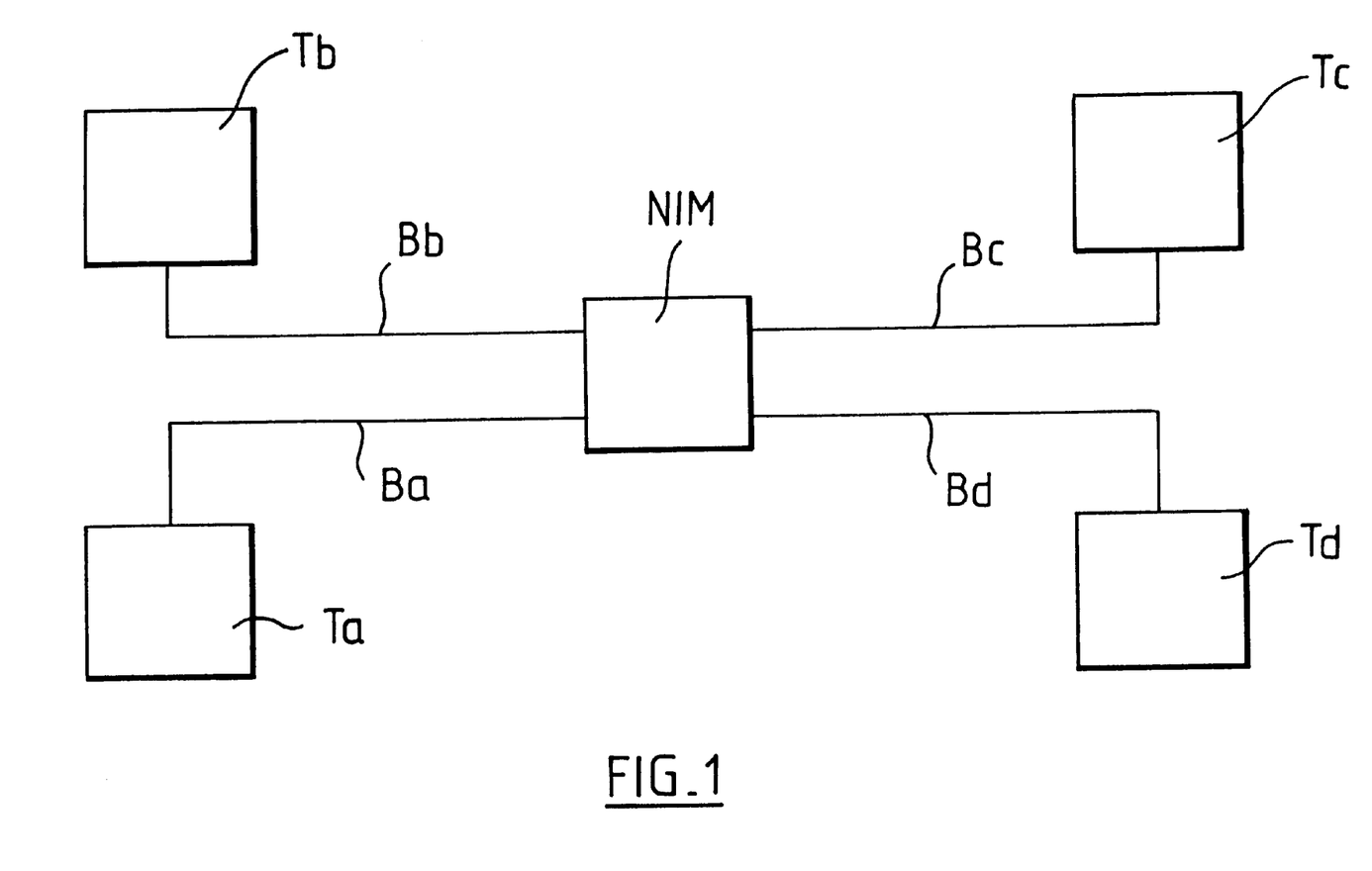
FIG. 1 gives an example of the interoperability according to the present invention among various software engineering tools.

FIG. 1 shows, in a schematic way and in conformity with the concept of the invention, the advantageous interoperability possible in a set of software engineering tools Ta, Tb, Tc, Td, etc., which tools exchange information in the form of data models, for example related to the development of applications. The tools Ta, Tb, Tc and Td are heterogeneous development tools, each of which is used in its own environment and with its own dictionary. The transformation of data models among these four tools is carried out by means of gateways such as Ba, Bb, Bc and Bd which make it possible to convert the format specific to one of the tools Ta, Tb, Tc, Td into the format specific to one of the other tools by passing through a unique neutral intermediate format, the neutral information model NIM. More precisely, the information exchanged passes through the export files of these tools, which thus transmit the data to or receive it from the model NIM, which is consequently the hub model. The data which instantiate the neutral information model NIM are stored in a base of data objects called a repository.

Figure 2:
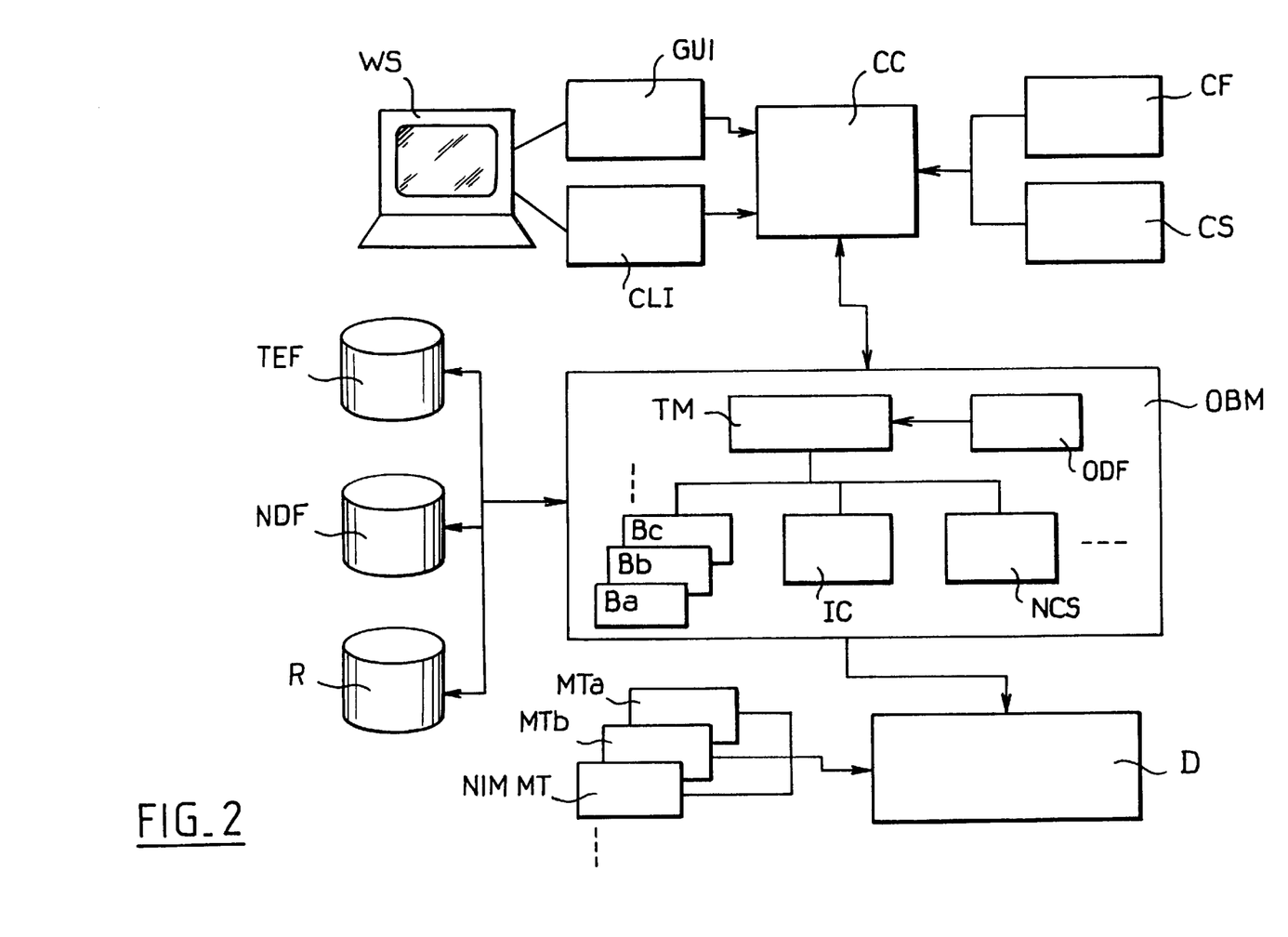
FIG. 2 represents an architecture in which there are various components which make it possible to implement the invention.

FIG. 2 offers an example of an architecture in which there are various components which make it possible to implement the invention, among which components are interfaces, controllers, storage mechanisms, configuration files, control-type sequences (scripts in the executed language according to the invention), gateways, and the repository. This environment may be considered to be a development toolkit. Every action of this toolkit is controlled by a control class CC, also called a programmer interface class, which class makes it possible to organize the environment for the transfer of data and to call the appropriate procedures. Developers of interfaces for displaying a workstation WS on the screen, such as the graphical user interface GUI, the command line interface CLI or any other interface, use the control class CC exclusively. This class CC contains the functions of the application interface (API) which makes it possible to call the gateways and to initiate any command. It is recalled here that a gateway is a specific mechanism for authorizing the movement of data from one location to another and their manipulation from one form to another, and that there are, among others, three types of gateways: import, export and transfer gateways. The control class CC is parameterized by the configuration files CF and the control-type sequences CS (scripts). The data can be loaded into memory in different forms and formats and at different locations. Four storage mechanisms can therefore be used, each of which has its own utility and its own set of associated services; these are the tool export files TEF, the neutral data file NDF, the repository R and a mechanism D for the dynamic allocation of model objects. A tool export file TEF is in fact a user data file generated by an external tool in the proprietary format of this tool; this file TEF can be read, written and analyzed using the means of the invention. A neutral data file NDF is a text file which contains the result of the modeling, according to the neutral information metamodel, of the model imported and initially structured according to the metamodel of the tool. This file NDF is an ASCII representation of this neutral representation of the model. Services for reading and writing the neutral data file NDF are provided according to the invention. A neutral data file makes it possible to transfer data related to C++ objects of an executable into C++ objects of another executable, while avoiding any loss of data. As for the repository R, it contains a schema which makes it possible to implement the neutral information model. A user's data can be stored in the repository in the format of the neutral information model and then managed and manipulated by tools of the repository which include the management of versions, requests, etc., while services are provided for storing data in or extracting them from the repository. A neutral data file NDF can also be stored in the repository like an object with its contents. The mechanism D for dynamically allocating model objects, which is also a strong point of the invention, provides an array of C++ classes used to represent data models in a totally generic way, and in the way specified by the data of the metamodel loaded at the moment of execution. A metamodel is loaded from a text file called a metamodel file and is stored like a C++ object. A user's data, which are then stored as C++ objects, are mapped in the associated metamodel. It must be noted that the neutral information module is a metamodel designed to be complete enough to make it possible to capture most of the concepts of all the tool metamodels. A C++ object which is loaded with the metamodel of the neutral information model is in fact a central or hub storage format from which any other storage format can be generated. The dynamic object allocation mechanism D contains all of the classes necessary for the implementation of the invention just as it contains all the metamodels MTa, MTb, . . . , NIM MT.

The four storage mechanisms—TEF files, NDF files, repository R and mechanism D—are directly connected to a gateway and operation mechanism OBM, which is also connected to the control class CC.

As indicated previously in connection with FIG. 2 and specifically in connection with the gateway and operation mechanism OBM, in order to execute transfers from one tool to another or from one format to another, there are several components designed to make it possible to execute the code of a gateway, each gateway being in fact an operation developed like an object-oriented program constructed with the aid of libraries of reusable classes. These classes are used to develop different gateways Ba, Bb, Bc, etc., bearing in mind that a gateway can be constructed in several phases, for example, a phase for physically decoding files through recognition of the codes and thus of the syntactical elements in the import file, followed by a phase for coding the transformation in which the elements corresponding to the syntactical elements in the neutral information model are found or created, and possibly also an integrity checking phase (mechanism IC). Each of these phases constitutes a reusable module, and all of the modules can be dynamically concatenated, not like a program but according to a sequence of procedures. For this purpose, the list of the modules to be dynamically concatenated is described with the aid of what is known to one skilled in the art as an operation definition file ODF used by what is known to one skilled in the art as a task manager TM, which will search for these modules among the executables containing the reusable procedures, in order to execute them and thereby construct the gateway, taking into account the configuration parameters for the adaptation of this gateway while allowing, as explained previously, an advantageous reduction in the execution time. All these parameters can be stored in a persistent space (CS), while the intermediate results are held temporarily in memory. The process for manipulating data models thus activates reusable components which allow gateways to be developed rapidly. It is possible to execute operations other than gateways, such as "standalone operations", which are operations in which the data are not necessarily moved or converted, for example integrity checking IC or name conversion services NCS.

For a better understanding of the concept of the invention, several definitions and descriptions of possible but non-limiting uses of various classes claimed by the present invention are offered below.

First, definitions of classes relative to the organization of "scripts" and to the configurations are offered, bearing in mind that a component of an application is a program which supplies an interface to a user of the environment of the invention, which may be any type of interface. The application instantiates an object of the control class (TsControl Class) on behalf of the user, then calls its functions in order to know which operations are available to this user. The user can either choose from among these operations and supply information as to the way in which these operations must be executed or specify predefined control "scripts" which contain these instructions and information. When the application allows it, the control class (TsControl Class) can also be used to create these predefined "scripts".

The control class (TsControl Class) is used to configure and initiate the operations in the environment of the invention. The application uses the functions for reading and writing the control "scripts" and creating the list of possible operations. The keyword values can be defined using the functions "set" and "get", and actions can be activated using the function "do". Some of these functions are generic when the user specifies the keyword or the operation to which the function is applied, whereas most of the functions are specific to known keywords or operations. The latter functions are designed to be used with an appropriate interface and the code of the component of the application.

```
class TsControl
    {
    TsSysConfig        sysconf;        //Configuration file object
    TsMessageLib       msglib;         //Message library object
    TsOperCtlScript                    //Control script
           *operctl;                   //Object pointer
    TsStr            opername;         //Operation name
    Singly_linked_list(TsKwdInfoPtr)   //Keyword list
                 keywords;             //
    Doubly_linked_list(TsStr)          //List of available tools
                 *tools_list           //
    int              error;            //Error status value
//Stored values of common known keywords
    TsTokens         importfiles;      //List of import files
    TsTokens         exportfiles;      //List of export files
    TsStr            *srcpctepath;     //Repository path name (source)
    TsStr            tarpctepath;      //Repository path name (target)
    TsStr            *srctoolname;     //Source tool name
    TsStr            tartoolname;      //Target tool name
    Ts Str           logfilepath;      //Log file path name
    TsBoolean        autonaming;       //Standardized name indicator
    TsBoolean        autochecking;     //Integrity check indicator
//Internal functions
    Doubly_linked_list(TsStr)*         //
    GetGroupPrompts(                   //Reading of group names
        Singly_linked_list(TsGroupInfoPtr)     //Info grouping and
                                                         return
                *group_list );    //to requestor
    TsKwdInfo *FindKeyword(            //Find keyword definition
            const TsStr& keyword) const;//object for a given
keyword
    void AddKeywords(const             //Add keywords to the list
        Singly_linked_list(TsKwdInfoPtr)& //List of keywords
                kwd_list        );//
//Constructor and destructor functions
    TsControl(                         //Constructor
        const TsStr&    sys_config_path, //Configuration file path
        const TsStr&    msg_lib_path    //Message library path
        );                //
    virtual-Tscontrol( );              //Destructor
//Functions for loading and generating control "scripts" and
 their execution
    int LoadNewOperCtlScript(          //Load a control script
        const TsStr& ctl_script_path   );//
    int WriteOperCtlScript( );         //Write values in control
                                            script
    int CreateOperCtlScript(           //Create a control script
        const TsStr& ctl_script_path   );//
    int RunOperCtlScript( );           //Execute control script
//Functions for setting and reading the name of the operation
    voidSetOperationName(              //Set the operation name
        const TsStr& opname    );//
    const TsStr& GetOperationName( ) const;     //Read the operation
                                                        name
//Functions for setting and reading the values of known keywords
    void SetTargetPctePath(            //Set repository path (target)
            const TsStr& tpath    );//
    const TsStr& GetTargetPctePath( ) const;    //Read repository
                                                    path (target)
```

```
        void SetSourcePctePath(           //Set repository path (source)
            const TsStr& spath       );//
        const TsStr& GetSourcePctepath( ) const;   //Read repository
                                                     path (source)
        void SetTargetToolName(           //Set target tool name
            const. TsStr& tname      );//
        const TsStr& GetTargetToolName( ) const    //Read target tool
                                                     name
        void SetSourceToolName(           //Set source tool name
            const TsStr& sname       );//
        const TsStr& GetSourceToolName( ) const;   //Read source tool
                                                     name
        void SetLogFilePath(              //Set log file path
            const TsStr& lpath       );//
        const TsStr& GetLogFilePath( )    const;   Read log file path
        void SetAutoNamingOn( );   //     Activates name standardization
        void SetAutoNamingOff( );  //     Cancels name standardization
        void SetAutoNamingFlag(           //Set name indicator value
            const TsStr& name_flag   );//Character string indicator
        int GetAutoNamingState( );        //Read name indicator status
        const char* const GetAutoNamingFlag( );    //Read name
indicator
        void SetAutoCheckingon( );        //Indicates integrity check
        void SetAutoCheckingOff( );       //Does not indicate integrity
                                            check
        void SetAutoCheckingFlag(         //Set integrity check indicator
                                            value
            const TsStr& check_flag  );//Character string indicator
        int GetAutoCheckingState( );      //Read integrity check
                                            indicator status
        const char *const GetAutoCheckingFlag( );  //Read integrity
                                                     check indicator value
        void SetImportFiles(              //Add import file names
            const TsStr& ifiles      );//String of import file names
        void AddImportFile(               //Add import file name
            const TsStr& ifile       );//Import file name
        void RemoveImportFile(            //Delete import file name
            const TsStr& ifile       );//Import file name
        int IsImportFileOnList(           //Verify whether name is on
                                            list
            const TsStr& ifile       );//Import file name
        const TsStr& GetImportFilesStr( );         //Read string of
                                                     import
                                                     file names
        const Doubly_linked_list(TsStr)&           //
            GetImportFilesList( );  //Read list of import file names
        void SetExportFiles(              //Add export file names
            const TsStr& efiles      );//String of export file names
        void AddExportFile(               //Add export file name
            const TsStr& efile       );//Export file name
        void RemoveExportFiie(            //Delete export file name
            const TsStr& efile       );//Export file flame
        int IsExportFileOnList(           //Verify whether name is on
                                            list
            const TsStr& efile       );//Export file name
        const TsStr& GetExportFilesStr( );         //Read string of
                                                     export
                                                     file names
        const Doubly_linked_list(TsStr)&           //
            GetExportFilesList( );  //Read list of export file
                                      names
        const Doubly_linked_list(TsStr)*           //
        ListTools( );                     //Read list of available tool names
//General keyword functions
        void SetKeywordValue(             //Add keyword to the list
            const TsStr& name,            //Keyword name string
            const TsStr& value       );//Keyword value string
        const TsStr& GetKeywordValue( //Find keyword value for
            const TsStr& keyword) const;//given keyword name
        void RemoveKeyword(               //Find keyword definition
            const TsStr& keyword);    object for given keyword name
        Doubly_linked_list(TsStr)*        //Find names of
        GetGroups(const TsKwdExpr& exp);  //Group hit criteria
        Doubly_linked_list(TsStr)*        //Find names of
        GetGroups(const TsKwdInfo& inf);  //Group hit criteria
//Functions for executing Specific operations (import, export,
etc.)
        void DoImport( );                 //Execute import operation
        void DoExport( );                 //Execute export operation
        void DoTransfer( );               //Execute transfer operation
//Other functions of classes
        operator int ( ) const;           //Record integer
        void Print( );                    //Print values in object
};                                        //End class TsControl
```

The class SysConfig is a class specific to the configuration file in the environment of the invention. Instantiation makes it possible to set the path name of the configuration file. This class can be used in two ways.

In the first way, during installation, an executable called by means of a special indicator and the path name of the configuration file instantiates this class and calls the static function "SysConfig::AppendLocalConfiguration( )" which has only to call the current configuration table of the executable (from a static table) at the end of the file. All information for the current executable which existed in the file previously is deleted.

In normal utilization, the class SysConfig has a function "SysConfig::LoadFile( )" for recording and analyzing the configuration file and creating the data structures of the executable, group, method, etc., which represent what exists in the present installation. The function LoadFile( ) also verifies that the configuration of the current executable corresponds to what is in the configuration file. A series of functions "SysConfig::Find . . . ( )" offers quick access to the structures of the system for the retrieval the configuration information.

```
class SysConfig
{
    TsStr pathname;       //Configuration file path name
    TsFileReader *input;  //Object fot reading configuration
    TsFileWriter *output; //Object for writing configuration
    Singly_linked_ring(TsExecInfo *) exec_list;   //Configuration
                                                    data structures
    TsExecInfo *curr_    //Pointer to current execution info
    exec.;
    TsGroupInfo *curr_group;    //Pointer to current group
    TsMethodInfo *curr_method;  //Pointer to current method
    SysConfig(const TsStr& path);      //Constructor
    ~SysConfig( );                     //Destructor
    int LoadFile( );                   //File reading and analysis
    TsExecInfo* FindExec(const TsStr&   //Find named
    name,
                                                    executable
        const TsStr& location); //
    TsGroup Info *FindGroup(const TsStr&       //Find named
    name);
                                                    group
    Ts MethodInfo *FindProc(constTsStr& name);//Find named
                                                    method
    static int AppendLocalConfiguration( );    //writing of info in
                                                    file
    static int DeleteLocalConfiguration( );    //Deletion of info
                                                    in file
}
```

The class OperCtlScript is a class specific to the control scripts of the environment of the invention. Instantiation makes it possible to set the path name of the control script. The function "OperCtlScript::LoadFile( )" is used to record and analyze the control script by creating a list of operations to be executed with the corresponding lists of keyword definitions.

The function "OperCtlScript::SaveFile( )" is used to retrieve the definitions and commands from a control script. This class also contains functions for the execution of commands and for the configuration and calling of the next executable.

```
class OperCtlScript
{
    TsStr pathname;                //Pathname of the script
    int temp;                      //Temporary indicator of the script
    TsFileReader *input;           //Object for script reading
    TsFilewriter *output;          //Object for script writing
    TsExecInfo *curr_exec;         //Current executable
    TsGroupInfo *curr_group;       //Current group
    TsMethodInfo *curr_method:     Current method
    SinglyLinked_List(TsMethodInfo *)    //Commands to be
    commands;
                                         executed
    Singly_Linked_List(TsDef *) defines;//Parameters for
                                         commands
    SysConfig *system;             //Pointer to the SysConfig object
    TsStr    next_exec;            //Next execution to be performed
    TsStr    next_loc;             //Next execution location
    OperCtlScript(const TsStr& path);    //Constructor
    ~OperCtlScript( );             //Destructor
    int LoadFile( );               //File reading and analysis
    int SaveFile( );               //Configuration file writing
    int SaveFile(const TsStr& new_path); //Creation of new file
    int RunCommands( );            //Call methods
    int passExecution( );          //Call new executable
}
```

The class TsDef is used to store and retrieve the keywords and the values of a control script.

```
class TsDef
{
    TsStr keyword;                 //Keyword identifier
    TsStr value;                   //Keyword value
    TsDef(const TsStr& kwd, constTsStr& val);    //Constructor
    ~TsDef( );                     //Destructor
    void SetValue(const TsStr& val);      //Set keyword value
    const TsStr& GetKeyword( );    //Read keyword identifier
    const TsStr& GetValue( );      //Read keyword value
}
```

The class TsKwdInfo is used to store and retrieve the keywords and request the identifiers of a configuration file. One object of this class also stores a pointer to the object TsDef which contains the current value (most recent definition) of the keyword.

```
class TsKwdInfo
{
    TsStr keyword;                 //Keyword identifier
    int prompt_id;                 //Guide string message
    TsDef *definition;    //Pointer to keyword value object
    TsKwdInfo(const TsStr& kwd,    //Constructor
        const TsStr& prmt);        //
    ~TsKwdInfo( );                 //Destructor
    int SetDef(const Singly_linked_list(TsDef *)& defs);    //Set
                                                keyword value
    const TsStr& GetKeyword( );    //Read keyword identifier
    const TsStr& get Value( )      //Read keyword value
    const TsStr& GetPrompt( );     //Read guide string
}
```

The class TsMethodInfo is used to identify a method with its keywords and associated options.

```
class TsMethodInfo
{
    TsStr name;                    //Method name
    TsGroupInfo *group;            //Return pointer to group object
    Singly_linked_list(TsKWdInfo *)    //List of keywords
    kwd_list;
```

```
    Singly_linked_list(TsKwdInfo *) opt_    //List of Options
    list;
    TsMethodInfo(const TsStr& nam, TsGroupInfo *grp);
                                   //Constructor
    ~TsMethodInfd( );              //Destructor
    const TsStr& GetName( );       //Read method name
    TsGrouplnfo *Getgroup( );//Read pointer to group object
    void AddKeyword(TsKwdInfo    //Add keyword to list
    *kwd);
    void AddOption(TsKwdInfo       //Add option to list
    *opt);
    TsKwdInfo *FindKey(const TsStr&    //Read keyword
    key_name);
}
```

The class TsGroupInfo is used to identify a group and its associated methods.

```
class TsGroupInfo
{
    TsStr name;                    //Group name
    TsExecInfo *exec;              //Return pointer to executable
    Singly_linked_list(TsMethodInfo *) method_    //List of
    list;
                                                  methods
    TsGroupInfo(const TsStr& nam, TsExecInfo
             *exec);//Constructor
    ~TsGroupInfo( );               //Destructor
    const TsStr& GetName( );       //Read group name
    TsExecInfo            //Read pointer to executable object
    *GetExec( );
    void AddProc(TsMethodInfo      //Add method to list
    *method);
    TsMethodInfo *FindProc(const TsStr& method_    //Read
    name);
                                                  method
}
```

The class TsExecInfo is used to identify an executable and its associated groups.

```
class TsExecInfo
{
    TsStr nane;                    //Executable name
    TsStr location;                //Executable path name
    Singly_linked_list(TsGroupInfo *) group_    //List of
    list;
                                                groups
    TsExecInfo(const TsStr& nam,    //Constructor
        const TsStr& location);    //
    ~TsExecInfo( );                //Destructor
    const TsStr& GetName( );       //Read executable name
    const TsStr& GetLocation( );   //Read executable path
    void AddGroup(TsGroupInfo*group);    //Add group to list
    TsGroupInfo*FindGroup(const TsStr& group_    //Read group
    name);
}
```

Definitions of classes relative to the representation of models and metamodels stored in memory and to the dynamic allocation of modeling objects are offered below. The mechanism used (called mechanism D in FIG. 2) makes it possible to store a metamodel definition and a data model in memory, for access by the components of the gateway, by dynamically allocating the objects of the model in this memory. This mechanism makes it possible to load a metamodel and then construct a model using the template of the metamodel. This type of construction advantageously allows rapid mapping between the objects, the property definitions and their instances. The mechanism D has private hidden classes and public interface classes. In order to store and access the data in the objects, a program uses functions of the public interface classes TsOBJ and TsLNK. The addressing objects use indexes in a tree of a pointer array for an object or link class, an object instance, a property type and a line list of the value; the object or link class and the property type can be given as text names which the interfaces map with the index values. In addition to the pointer arrays for direct access to a hierarchical view of the data, the mechanism D has index arrays ordered by the property-key values of the corresponding objects, which supply rapid access (dichotomizing search) to the objects selected and allow the display of objects ordered by field-keys.

The "constructor" of the mechanism D calls the function readMetaModel in order to read the file of property and object definitions. This routine creates an object class definition for each type of object, inserting the object class definition address into the object class array ordered by class name. The mechanism D supports inheritance. Moreover, it inserts each property into a property array ordered by property name. Once the objects and the properties are defined, the object class index and each object class property index are frozen, ready to be used to construct a model.

A tool constructs and manipulates a model (neutral information tool or model NIM) in this mechanism D. When it is called to set a property value, the mechanism D executes the following steps, which are optimized when the names are already mapped with index values and when the objects created on request already exist:

search for the name of the object type in the object class array in order to read the index clNdx, at the position clNdx in the model object array, find or create the element for the object instance array and allocate a new index objNdx, create a new object and store its address in the object instance array, search for the property name in the property definition array to find the index propNdx, at the position PropNdx in the object property instance array, find the address of the property value or create a new one and store this address there, search for the line number in the list of property values, and if found, store the value in the property value object; if not found, create a new property value and insert it into the list, index the property instance array to find where to store the property value pointer, by storing a primary or secondary property-key value, insert or update the index objNdx in the corresponding index table ordered by the key value.

The property instance array is a concatenation of the current and former class property pointers.

The classes TsDynamo, TSOBJ, and TsLNK define the user interface for access to the mechanism D. The class TSOBJ makes it possible to index the class, the object, the property and the line by supplying an addressing mechanism in the objects of the mechanism D. The class TsLNK carries out the addressing of the links of the mechanism D. The interface of the mechanism D offers the user a scope of application (data modeling) and hides the pointers, the structures and the C++ memory allocation. The TSOBJ iterators loop all the object classes or all the occurrences of an object class or all the properties. A program can scan a model or select a part or a sub-tree of objects and properties. The TsLNK iterators (derived from the TsOBJ iterators) loop the links. A program can scan a model by running through the links between objects. A link can have properties since it inherits this possibility from the class TSOBJ.

The class TsDynamo has objects (C++ objects will hereinafter be referred to as dynamo objects) which designate a metamodel and a model in the process of being manipulated. An object TSOBJ designates a dynamo object and contains the indexes of a position in the model. The position of an object TSOBJ can be set by class and property names in character strings and/or by index values. This makes it possible to combine the multi-purpose quality of the names during execution with the efficiency of using subscripts. The index values equal to 1 correspond to default values.

```
#include<tsdynamo.h>
TsDynamo PAC("pac", "Test Model");   //construct PACLAN/X (tool)
TsDynamo NM("nim", "Neutral Model");   //construct NIM
TsOBJ PAC_ORB(PAC, "ORB");
while (PAC_ORB.nextObj( ))         //iteration throughout the ORB
{
if(PAC_ORB("TYPE")!="O")continue;  //select OBJs, skip RELs
TsOBJ NIM_BEN(NIM,"BEN");
NIM_BEN.setObj( );                 //create new BEN
NIM_BEN("TITLE") = PAC_ORB("NAME"); //copy properties
NIM_BEN("ALIAS") =PAC_ORB("CODE");
NIM_BEN("NOTES", 1) = "%PX8_CODE" + PAC_ORB("CODE");//
        concatenation of properties
NIM_BEN("NOTES", 2) = "%PX8_NAME" + PAC_ORB("NAME");//
second
        line of NOTES
NIM_BEN("NOTES") += PAC_PRB        //append to the array or
("DOC");
        block
NIM_BEN("TITLE") += "suffix";      //concatenate with the value
NIM_BEN("PROP") = Str(PAC_ORB("PROPERTY"),5,6);//substring
        displacement 5, length 6
}
    Important: TsOBJ = TSOBJ; means to copy the property value
and not the object TsOBJ!
TsOBJ nim_obj(nim);          //copy clones of constructor TsOBJ nim
nim_obj.copy(nim);           //copy TsOBJ nim into TsOBJ nim_obj
nim_obj = nim;               //copy property value of nim to nim_obj
        "Include" files labelled
#include "tsarray.h"
#include "tsstr.h"
#include "tsrec.h"
    I/O manipulators
#define setleft setiosflags(ios::left)
#define resetleft resetiosflags(ios::left)
    Step-by-step execution of macros
extern int Tracing;
#define TRACE(arg)if(Tracing)cout << setw(5)_LINE_ << "" << arg
        << NL;
        #define COPL(c) "TsOBJ(" << c->classNdx << ","
        << c->objNdx <<
        "," << c->propNdx << "," >> c->lineNbr << ")"
    Array Sizes - Growth in increments TsArray
const int MaxClass = 128;        //Class types (not object
                                     instances)
const int MaxProps = 64;         //Properties per object
    const int MaxKeys = 64;//Block-key capacity
    Property types defined in metamodels
enum TsPropType {    Value=1,    //value of simple string
                     Array=2,    //values of multiple independent
                                     strings
                     Block=3,    //multiple lines of continuous text
extern const char* TspropTypeStr[ ];         //disposition for
                                                converting "enum"
                                                into a string
inline const char* cvPropType(TsPropType t)   //convert "enum"
                                                into a string for
                                                display
{
    return TsPropTypeStr[t >= Value && t
<=Block ? t:0];
}
    *Labels
class TsDynamo;
class TsPropValue;
class TsObjectInst;
class TsObjKeyArray;
class TsObjInstArray;
```

```
class TSModelObjArray;
class TsPropDefnArray;
class TsPropDefn;
class TsObjClassDefn;
class TsObjClassArray;
class TsLinkInst;
class TsLinkKeyArray;
class TsLinkInstArray;
class TsModelLnkArray;
    Dynamo - Interface class
class TsDynamo
{
    friend class TsOBJ;
    friend class TsLNK;
        class TsObjClassArray*    oca;     //Object class array of
                the metamodel
        class TsModelObjArray*    moa;     //Object array of the
                model
        class TsLnkClassArray*    lca;     //Link class array
                of the metamodel
        class TsModelLnkArray*    mla;     //Link array of the
                model
TsDynamo(const char* metaModelName, const char* modelName);
TsDyanmo(const TsDynamo& d, const char* modelName);
                                          //same metamodel, new
                    model
~TsDynamo( )        //destructor
void display( );                          //Dynamo Scanning, display values
void dump( );               //copy model image into object,i9,property,
                i9,value format (OBS)
void writeNDF(char* ndfPath);             //Dynamo Scanning, write
                values
int readMetaModel(const char*fileName);   //read object/property
                definitions
void define(const char* obj, const char* prop, char* key,
                TsPropType prop_Type, int prop_Size);
void freeze( );
```

In the class TsOBJ, an object TsOBJ is a pointer for addressing objects in a dynamo object. The functions TsOBJ make it possible to access dynamo objects by indexing the pointer table using some or all of the values Ndx.

```
class TsOBJ   //Index numbers for addressing a value in the
        mechanism D
{
TsDynamo*   dyn;        //pointer for locating data in dynamo
int         classNdx;
int         objNdx;
int         propNdx;
            lineNbr;
int         iterNdx//key array index for iterators, beginning with -1
int         error;             //0: ok, >0: incorrect address, skip
    TsOBJ constructor with numerical values
TsOBJ(TsDynamo& aDyn,
        int aClassNdx=1,
        int aObjNdx=1,
        int aPropNdx=1,
        int aLineNbr=1);
```

TsOBJ constructor with names of classes and properties

```
TsOBJ(TsDynamo      &aDyn,
      const char*   aClass,
      int           aObjNdx=1,
      const char*   aProp=1,
      int           aLine=1);
```

Constructor of TsOBJ copy

TsOBJ(TsOBJ& c);

TsOBJ Destructor -TsOBJ( ){ }

Functions for addressing the dynamo objects via TsOBJ

```
TsStr&              getv( );
TsPropValue*        getPropValue( );
TsObjectInst*:      getObject( );
TsObjKeyArray*      getPrimeKeyArray( );
TsObjKeyArray*      getSecndKeyArray( );
TsObjInstArray*     getObjInstArtay( );
TsModelObjArray*    getModelObjArray( );
TsPropDefnArray*    getPropDefnArray( );
TsPropDefn*         getPropDefn( );
TsObjClassDefn*     getObjClassDefn
TsObjClassArray*    getObjClassArray( );
char*               getClassName( );
char*               getPropName( );
```

Functions for setting and reading the values of objects and properties in a model int setObj(const char* aClass, int aObjNdx=1);

int setProp(const char* aProp);

int setValue(const char* aProp, int aLineNbr, const char* aValue);

int setValue(int aLineNbr, const char* aValue);

int setValue(const char* aValue) {return setValue(1, aValue);} int setValue(TsStrList* aValue);

TsStr getValue(const char* aObj, int aObjNdx, const char* aProp, int aLineNbr=1);

TsStr getValue(const char* aProp, int aLineNbr=1);

TsStrList getList(const char* aProp);

TsPropType getPropType( );

int findObj(const char* aObj, const char* aProp, const char* aValue);

Operator functions for improving the syntax of the gateways

```
TsOBJ& operator( )(const char* aObj, int aObjNdx, const char*
        aProp, int aPropNbr);
TsOBJ& operator( )(const char* aObj, int aObjNdx, const char*
        aProp);
TsOBJ& operator( )(const char* aObj, char* aProp);
TsOBJ& operator( )(const char* aProp, int aLineNbr);
TsOBJ& operator( ) (const char* aProp);
TsOBJ& operator( )( );      //op( )does not authorize a default
TsOBJ©(TsOBJ& b); //copy TsOBJ
TsOBJ& operator=(TsOBJ& in);    //copy the property value
TsOBJ& operator=(const char*    //copy the string value
in);
TsOBJ& operator+=(TsOBJ& in); //append the property value
TsOBJ& operator+=(char*in);     //append the string value
int operator!( ){return error;}   //indicates if last ref or
        allocation has failed
operatorTsStr&( ){returngetV( );} //conversion of op activates
        all Str ops
    Iterator functions for scanning the classes, objects,
    properties, lines.
    Return to 0 when the last occurence has passed, to end the
    iteration.
    Pointers "null" indicating a jump in the arrays.
    int firstClass( );
    int firstObject( );
    int firstProperty( );
    int firstLine( );
    int nextClass( );
    int nextObject( );
    int nextProperty( );
    int nextLine( );
}
```

-continued

```
    Cardinality
enum Cardn {C0__1, C1__1, C0__M, C1__M};
extern char* Cardn__str[ ];        //array of strings for
    converting Cardn into text
```

Class index/object index pair for sorting a key property value

```
            struct Clob
            {
              int        classNdx;
              int        objNdx;
            }
```

In the mechanism D, the classes "Metamodel" represent the neutral information model NIM or the metamodel of the tool in question as a constant structure in order to interpret the data in the model to be manipulated.

Definitions of property definition array classes

```
 Array of strings for converting "enum" into text
const char* TsPropTypeStr[]={"??", "Value", "Array", "Block"};
class TsPropDefn                //contained in PropDefnArray
{
  friend class TsPropDefnArray;
  friend class TsObjectInst;
  friend class TsOBJ;
TsStr        propName;
TsPropType   type;
int          length;
  TsPropDefn(const char* aPropName, TsPropType aType, int
    aLength);
  ~TsPropDefn{}
};
 Property definition array
TsArray(TsPropDefn*, TsPropDefnPtArray);    //specializes the
                                              template
class TsPropDefnArray
{
  friend class TsObjClassDefn;
  friend class TsObjClassArray;
  friend class TsObjectInst;
  friend class TsDynamo;
  friend class TsOBJ;
  TsPropDefnPtArray        Prop;
TsPropDefnArray() : Prop(MaxProps){}
~TsPropDefnArray();    //deletes each object designated by the
                         array
  void display(TsOBJ* at);
  TsPropDefn* define(const char* aName, TsPropType aType, int
    aLength);
  TsPropDefn* insert(const char* aName, TsPropType aType, int
    aLength);
  int getIndex(const char* aName);
  TsPropDefn* find(const char* aName);
}
 Find the property name and return its array index (or 0)
int TsPropDefnArray::getIndex(const char* name);
 Find the property name and return the PropDefn address (or
    NULL)
TsPropDefn* TsPropDefnArray::find(const char* name);
 Insert TsPropDefn into TsPropDefnArray sorted by property
name
TsPropDefn* TsPropDefnArray::insert(const char* aName, TsPropType
    aType, int aLength);
 Define a new TsPropDef, verify whether the property name is
a duplicate
TsPropDefn* TsPropDefnArray::define(const char* Name, TsPropType
    Type, int Length)
```

Object class definition, metamodel object information

```
class TsObjClassDefn
{
        friend class TSObjClassArray;
        friend class TsObjInstArray;
        friend class TsObjectInst;
        friend class TsDynamo;
        friend class TsOBJ;
        TsStr         className;       //object class name
        TsStr         parentName;      //name of object having a
                                         relationship
        TsObjClassDefn* parent;        //inherited properties
        TsPropDefnArray* pda;          //dichotomizing search for
                                         property name
        TsStr         primeKeyName;
        int           primKeyPrNdx;
        TsStr         secndKeyName;
        int           secndKeyPrNdx;
        TsObjClassDefn(const char* Name, const char* ParentName=0,
                       const char* Prime=0, const char* Second=0);
        ~TsObjClassDefn()
        void TsObjClassDefn::display(TsOBJ* at);
        Translate the property-key indexes when the metamodel is
frozen
        voidTsObjClassDefn::resolveKeys()
};
```

Definition of the object class array

```
   Object class array, top of the metamodel
TsArray(TsObjClassDefn*, TsObjClassDefnPtArray);    //specializes
                                                      the template
class TsObjClassArray
{
  friend class TsOBJ;
  TsObjClassDefnPtArray    Class;
  Tsstr     metaModelName;
  int       usageCount;     //protects the common metamodel
  int       isFrozen;       //0=find insert new obj/prop defns
  TsObjClassArray(const char* name) : Class(MaxClass);
  ~TsObjClassArray();
  void release(){if(--usageCount == 0)delete this;}
  void display (TsOBJ* at);
  void writeNDF(TsOBJ* at, ostream& ndf);
  void resolveKeys();
  TsObjClassDefn* define(const char* name);
  TsObjClassDefn* defineKey(const char* obj, char* key,
          const char* prop);
  TsObjClassDefn* insert(const char* name);
  TsObjClassDefn* find(const char* name);
  int getIndex(const char* name);
}
   Translate the class name having a relationship and the
property- key indexes
voidTsObjClassArray::resolveKeys();
   Find the index of the array for the object class name
int TsObjClassArray::getIndex(const char* name)
   Find the object class definition address through its object
class  name
TSObjClassDefn* TsObjClassArray::find (const char* name)
   Insert object class definition into the object class array
   sorted by class name
TSObjClassDefn* TsObjClassArray::insert(const char* name)
   Define a new object class definition in the object class
   array, verifiy whether duplicate
TsObjClassDefn* TsObjClassArray::define(const char* name)
   Define a first or a second property-key name
TsObjClassDefn* TsObjClassArray::defineKey(const char* obj,
          char* key, const char* prop)
```

In the mechanism D, the model data classes represent the user's model in the structure defined by the corresponding neutral information model NIM or by the metamodel of the tool in question.

Definition of property value class

```
class TsPropValue                          //string with one property value
{
  friend class TsObjectInst;
  friend class TsObj;
  TsPropValue* next;                       //the properties with multiple
                                           values are concatenated
  int       lineNbr;//sort file for insertion
  TsStr     V;       //the string allocation supports
                resizing
  TsPropValue(int line_Nbr, const char* val)
  ~TsPropValue(){}
  void display(TsOBJ* at);
  void dump(TsOBJ* at);
  void writeNDF(TsOJB* at, ostream& ndf);
  void set(int line_Nbr, const char* val);
  TsStr get(int line_Nbr);
  operator const char*() const{return)const char*)V;}
{
void TsPropValue::display(TsOBJ* at)
void TsPropValue::dump(TsOBJ* at)
void TsPropValue::write NDF(TsOBJ* at, ostream& ndf)
  Set a line number and a value for a property value
void TsPropValue::set(int line_Nbr, const char* val)
  Set a multiline property value
void TsPropValue::set(const TsStrList* val)
  Read a property value by its line number
TsStrTsPropValue:: get(int line_Nbr)
  Read a multiline property value
TsStrList TsPropValue::get()
```

Definition of object instance class

The object instance contains a property instance array, it designates the property values

```
TsArray(TsPropValue*, TsPropValuePtArray);        //speciaiizes the
                                                   template
class TsObjectInst              //index parallel to PropDefnArray
{
  friend class TsObjInstArray;
  friend class TsOBJ;
  TSPropValuePtArray    Prop;
  TsObjectInst() : Prop(MaxProps){}
  ~TsObjectInst()
  void display(TsOBJ* at);
  void dump(TsOBJ* at);
  void writeNDF(TsOJB* at, ostream& ndf);
  TsPropValue* setValue(TsOBJ* at, const char* val);
}
```

Definition of object key array class

Object key array, object index using a key property

```
TsArray(int, TsObjNdxArray);      //specializes the template
class TsObjKeyArray              //objNdxs sorted by key property
       value
{
  friend class TsObjInstArray;
  friend class TsOBJ;
  TsObjNdxArray objNdx;    //deliver in order or dichotomizing
                search
  TsObjKeyArray():objNdx(MaxKeys){}
  ~TsObjKeyArray(){}
  void display(TsOBJ* at);
  void insert(TsOBJ* at);
  int find(char* val);
}
```

Definition of the object instance array class

```
TsArray(TsObjectInst*, TsObjectPtArray);   //specializes the
                                            template
class TsObjInstArray      //object instances indexed by objNdx
{
  friend class TsModelObjArray;
  friend class TsOBJ;
  TsObj KeyArray*           primeKeyArray;
  TsObjKeyArray*            secndKeyArray;
  TsOOjectptArray           Obj;
  TsObjInstArray() : Obj(MaxKeys)
  ~TsObjInStArray()
Position an object index, or create it if necessary
  TsObjectInst* setObject(int objNdx)
  void display(TsOBJ* at);
  void dump(TsOBJ* at);
  void write NDF(TsOBJ* at, ostream& ndf);
  void updateKey(TsOBJ* at);
}
  Update an object key array by insertion in conformity
  with the key property value
void TsObjInstArray::updateKey(TsOBJ* at)
  Set the current property at the given value
TsPropValue* TsObjectInst::setValue (TsOBJ* at, const char* val)
```

Definition of model object array class

```
Model object array, top of model, designation of object
instances
TsArray(TsObjInstArray*, TsObjInstPtArray);   //specializes the
                                               template
class TsModelObjArray         //object classes indexed by clndx
{
  friend class TsOBJ;
  TsStr   modelName;
  TsObjInstPtArray  Class;
public:
  TsModelObjArray(const char* Name):Class(MaxClass)
  ~TsModelObjArray()
  void display(TsOBJ* at);
  void dump(TsOBJ* at);
  void writeNDF(TsOBJ* at, ostream& ndf);
  Position the current object instance array with the
  class index
  TsObjInstArray* setClass(int classNdx)
}
```

A link class definition in the mechanism D is a subclass of an object class definition. A model link is an instance of a link. A link class definition describes the object classes that the links can connect. A link instance specifies the model object instances that are connected to it.

The link objects are derived from regular objects because the links have the characteristics of objects (they have the names and can have the properties), but they also have vectors "to" and "from" and a cardinality. In order to optimize performance, the data elements in addition to the links are coded in C++ language rather than being used like object properties. The sorted index arrays also make it possible to optimize searching.

The constructor of the mechanism D reads the link definitions with the other object definitions from a tool metamodel or from the metamodel file of the neutral information module NIM.

A link contains the object indexes clNdx and objNdx coming from and going to the objects, which makes it possible to find the model objects which are connected by the link. A link definition specifies the objects it can collect, but a real class can be derived from a specified object class, so the links contain the indexes clNdx and objNdx. The links can have properties just as they have objects.

The fact that a link is created between two objects also implies that it is entered into the index array. A link key array is sorted to find all the objects or specific objects that a link type already collects. An object link array is sorted to find all the links or specific links coming from or going to a given object. The link class definition can contain an index prop-Ndx of a property whose value determines the order of iteration through the links of an object. This makes it possible to inspect the attributes of an entity and the sub-fields of an attribute in a specific order. The default sequencing of link index arrays uses the target object key, which facilitates the dichotomizing searches and the ordering of the listings.

The gateway structure which makes it possible to map one model of a metamodel with another actually implements a hierarchy of loops which use iterators to inspect each primary object of a model and then run through its links or use foreign keys to find associated objects. The other operations which modify a model NIM, whether already resident or copied, use this same general type of operation for integrity checking and other housekeeping operations.

```
#include "tsdynamo.h"
//Set of strings for mapping the values "Cardn enum" with the
  text
char* Cardn_str[] = {"0:1", "1:1", "0:m", "1:m)};
  Link class definition
class TsLinkClassDefn : TsObjClasssDefn
{
  friend class TsLNK;
  friend class TsLinkClassarray;
  TsStr   fromVerb;
  TsStr   toVerb;
  int     fromClNdx;
  int     toClNdx;
  Cardn   fromCardn;
  Cardn   toCardn;
  int     toKeyPropNdx;  //ordering of an object link array
  TsStr   toSetMbr;
  TsStr   fromSetMbr;
  TsLinkClassDefn(  const char* aClassName,
                    const char* aFromVerb,
                    const char* aToVerb,
                    const char* aFromClName,
                    const char* aToClName,
                    const char* aFromCardn,
                    const char* aToCardn,
                    const char* aToKeyPropName,
                    const char* aToSetMbr,
                    const char* aFromSetMbr);
  void display(TsLNK* at);
}
void TsLinkClassDefn::display(TsLNK* at);
  Link at the level of the model
class TsLinkInst : TsObject Inst
{
  int    fromClNdx;
  int    fromObjNdx;
  int    toClNdx;
  int    toObjNdx;
  TsLinkInst(TsOBJ& aFrom, TsOBJ& aTo);
  ~TsLinkInst(){}
  void display(TsLNK* at);
  void PutNDF(ostream& ndf, TsLNK* at);
  TsPropValue* setProp(TsLNK* at, const char* val);
}
void TsLinkInst::display(TsLNK* at);
  Link key array, index of links sorted using a key property
TsArray(TsClob, TsClobArray);      //specializes the template
TsLinkKeyArray         //lnkNdxs sorted by the target
    object key property value
{
  friend class TsLinkInstArray;
  friend class TsLNK;
  TsClobArray          linkNdx;//deliver in order or
    dichotomizing search
  TsLinkKeyArray() : linkNdx(MaxKeys){}
  ~TsLinkKeyArray()
```

-continued

```
  void display(TsLNK* at);
  void insert(TsLNK* at);
  int find(char* val);
}
```

Update from a link key array, insertion in conformity with the key property value
void TsLinkInstArray::updateToKey(TsOBJ* at);
Update from a link key array, insertion in conformity with the key property value
void TsLinkInstArray::updateFromKey(TsOBJ* at);
Class TsLNK, interface class
The class TsLNK is derived from the class TsOBJ. The additional capabilities of the class TsLNK relate to searching or navigation between objects in a model by means of links in the metamodel.

```
Choose the current link
int TsLNK::setLink(const char* aClass, int aLnkNdx);
//Set the link specific to the given indexes
//Increase the link tree if necessary
int TsLNK::setLink(TsOBJ& from, TsOBJ& to);
  Reset current link
int TsLINK::resetLink(TsOBJ& from, TsJBJ& to);
  Read the target of the specific link
TsClop TsLINK::getTarget( );
  Read the source of the specific link
TsClop TsLNK::getSource( );
  Find the link index for the type of link required and the
  key value
int TsLNK::findLink(const char* aLnk, const char* aProp, const
    char* aVal);
```

Insert current object index into its vector index array void TsvtrKeyArray::insert(TsOBJ* at)
Definitions of classes relative to the coding and decoding of records in various tool export file formats are offered below.

Record descriptors for fields of variable length

The C and C++ languages do not fully support records. They offer character arrays and structures with data elements such as character arrays and sub-structures. After a structure has been declared, the programmer must recode the length information in the procedural code in order to be able to access its contents. Fields of variable length which use separators are typically processed by coding the syntax of the records into the code which executes the syntactic analysis of these records. The advantageous solution presented and defined in the present case is to use record declarations as a collection of field descriptors. First, the programmer defines fields of fixed and variable size and assigns codes with constant values to the record types, as well as separator values. Next, in the procedural code, the programmer calls functions for mapping a record with its descriptor, then accesses the fields in the record. In order to output the information, the programmer calls functions which make it possible to delete the record, fill its fields and then supply the complete record for its output. The record description contains the name, the type and the size of the information at the moment of execution. The descriptive information and the data can be displayed for updating.

With the class TsRec, the file tsrec.h defines macros for constructing record descriptors and function prototypes for matching a register with a record description by supplying data from a field of the record, setting data in a record field and supplying a complete record which allows it to be output.

Thus, the class TsRec can process a large number of files of the mechanism D and tool export files written and read by the components of the gateway.

```
Define the field types
enum TsFieldType{REC, BRF, LIT, FLD, VAR, END};
  A record description is an array of structures
  TsFieldDescr.
struct TsFieldDescr
{
  TSFieldType    type;
  char*          name;
  int            length;
};
  Macros to aid programmers in defining record descriptions
#define MaxRec(len) const int RecBufsize = len;
#define XRec(name) extern char RECBUF##name[];\
                extern TsFieldDescr name[];
#define Rec(name) char RECBUF##name[RecBufSize+1];\
                TsFieldDescr name[] = {{REC, #name, 0},\
                {BFR, RECBUF##name, RecBufSize},
#define Lit(string) {LIT, string}
#define Fld(name,len)    {FLD, #name, len}
#define Var(name)      {VAR, #name}
#defineEnd         {end}}
  Macros for accessing the field values
#define GetFld(rec,fld) getfld(rec, #fld)
#define SetFld(rec,fld,val) setfld(rec, #fld, val)
  Function prototypes
  Convert an integer into ASCII with base, size and fill
    options
char* itoa(int value, int base=10, int size=0, char fill='');
  Inverse conversion from ASCII into integer
int atoi(const char* p);
  Dynamic record functions
  Matching a register with a record
int match(char* buffer, TsField Descr* f);
  Read a field of a record
TsStr getfld(const TsFieldDescr* rec, const char* name);
  Read a field with a char* value
void setfld(TsFieldDescr* rec, const char* name, const char*
    value);
  Read a field with a value of the class TsStr (defined below)
inline void setfld(TsField Descr* rec, const char* name, const
    TsStr& value);
  Read a field with an integer value converted into char*
inline void setfld(TsFieldDescr* rec, const char* name, const int
    value)
{
  setfld(rec, name, itoa(value));
}
  Delete a record
void clear(TsFieldDescr* rec);
  Display a record
void display(const TsFieldDescr* rec);
  Convert the type "enum TsFieldType" into char* symbol
char* aTsFieldType(const TsFieldType t);
  Read the record name pointer
inline char* GetRec(const TsFieldDescr* rec){return(rec+1)-
    >name;}
  Declare IO_TAF in order to be exterior
XRec(IO_TAF);
  Definitions of classes relative to the manipulation of
character strings are offered below.
Definition of the character string class TsStr
```

The header file tsstr.h contains the definitions of the class TsStr which supplies a type of character string data that is particularly advantageous in that it behaves like many types of data integrated in C language. Also of great importance is the fact that it prevents any loss of information generally associated with losses of storage blocks.

The object of the class TsStr is to define a class of C++character strings, making it possible to support the allocations, the concatenations and the comparison operators with the substring and dynamic memory reallocation functions, while preserving compatibility with the character strings char* of a C-type language.

```
  New line character macros
#define NL "\n"
#define NL2 "\n\n"
  Variable display with name
#define SEE(x) ""#x":" << x
//                   Usage: cost << SEE(abc) <<
                SEE(xyz);
  Character string class
class TsStr
{
  char*    pt;//array of dynamically allocated characters
  size_t   in;//length of current data
  size_t   bs;        //block capacity (stopper not counted)
  Set empty TsStr with default block size
  void Defaults(){bs = 16; ln = 0; pt = new char[bs+1]; pt[0] =
      '\0';}
public:
  Construct the class TsStr, initialized by the character
    string char*
  TsStr(const char* cp);
  Construct the class TsStr, initialized by TsStr
  TsStr(const TsStr* b);
  Construct the class TsStr by default
  TsStr(){Defaults();}
  Construct an empty class TsStr with a given block size
  TsStr(int len);
  Construct a class TsStr with a given character string
    char* and length
  TsStr(const char *cp, const int len);
  Destructor: delete the character array
  ~TsStr(){delete[]pt;}
  Assign a class TsStr = a TsStr
  TsStr& operator = (const TsStr &b);
  Assign a class TsStr = char* string
  TsStr& operator = (const char* bpt);
  Assign a class TsStr = a character
  TsStr& operator = (char b));
  Concatenate a class TsStr + a class TsStr
  TsStr& operator + (const TsSt &b) const;
  Concatenate a class TsStr + a character string char*
  TsStr& operator + (const char* bpt) const;
  Append a class TsStr to a class TsStr
  TsStr& operator += (const TsStr &b);
  Append a character string char* to a class TsStr
  TsStr& operator += (const char* bpt);
  Append a character to a class TsStr
  TsStr& operator += (char b);
  Convert a class TsStr into a character string char*
  operator char*(){return pt;}        //conversion operator
  Convert a constant reference of the class TsStr into a
    constant character string char*
  operator const char*()const{return pt;} //conversion operator
  Compare a class TsStr to a class TsStr
  int operator == (const TsStr &b) const {return strcmp(pt, b.pt)
      == 0;}
  int operator != (const TsStr &b) const {return strcmp(pt, b.pt)
      != 0;}
  int operator > (const TsStr &b) const {return strcmp(pt, b.pt)
      >0;}
  int operator >= (const TsStr &b) const {return strcmp(pt, b.pt)
      >= 0;}
  int operator < (const TsStr &b) const {return strcmp(pt, b.pt)
      < 0;}
  int operator <= (const TsStr &b) const {return strcmp(pt, b.pt)
      <= 0; }
  Compare a class TsStr to a character string char*
  int operator == (const char* b) const {return strcmp(pt, b)
      == 0;}
  int operator != (const char* b) const {return strcmp(pt, b)
      != 0;}
  int operator > (const char* b) const {return strcmp(pt, b) > 0;}
  int operator >= (const char* b) const {return strcmp(pt, b)
      >= 0;}
  int operator < (const char* b) const {return strcmp(pt, b) < 0;}
  int operator <= (const char* b) const {return strcmp(pt, b)
      <= 0;}
  Compare a character string char* to a class TsStr
  friend int operator==(const char* a, const TsStr &b){return
      strcmp(a,b.pt)==0;}
```

-continued
```
friend int operator!=(const char* a, const TsStr &b){return
    strcmp(a,b.pt) !=0;}
friend int operator>(const char* a, const TsStr &b){return
    strcmp(a,b.pt)>0;}
friend int operator>=(const char* a, const TsStr &b){return
    strcmp(a,b.pt)>=0;}
friend int operator<(const char* a, const TsStr &b){return
    strcmp(a,b.pt)<0;}
friend int *operator<=(const char* a, const TsStr &b){return
    strcmp(a,b.pt)<=0;}
  String output operator for the classTsStr
friend ostream& operator << (ostream& s, const TsStr& a){return
    s << a.pt;)
  String input operator for the class TsStr - read a line
friend istream& operator >> (istream& s, TsStr& a);
  Read pointer of character string char* of the class TsStr
friend char* getPt(const TsStr& s){return s.pt}
  Read string length of the class TsStr
friend int strlen(const TsStr& s){return s.ln;}
  Read a character of the class TsStr with a given offset
friend char ch(const TsStr& str, int offset){return
    str.pt[offset];}
}          //end definition of class TsStr
```

The following are descriptions of classes and files which contain classes used in the environment of the present invention.

Definitions of the input/output class TsFile

The header file tsfile.h contains the definitions of the classes TsFile, TsFileReader, TsFileWriter, TsDataReader, and TsDataWriter. These classes make it possible to encapsulate file input/output operations.

The class TsFile makes it possible to encapsulate calls of the UNIX system (registered trademark licensed exclusively through the X/OPEN Company, Ltd.) which use a file pointer; since the opening and closing of the file are processed by the constructors and destructors, the requestor's task is simplified considerably.

The other classes constructed with this encapsulation offer the possibility of reading and writing a line, and thus an entire file, at the same time.

```
class TsFile
{                                    //
  FILE * const  fp;                  //file pointer
  TsFile(                            //Constructor
    const char   *path,              //File pathname
    const char   *mode = "w"         //Opening mode
  );                                 //
  ~TsFile();                         //Destructor
  int flush();                       //Queue overload
  char *gets(char *s);               //Read overload (s)
  int puts(char *s);                 //Write overload (s)
  int putc(char c);                  //Write overload (c)
}                                    //End of class TsFile
                                     //
class TsFileReader                   //Reads lines of a file
{
  TsFile    *f;
  char      *buffer;
  TsFileReader(                      //Constructor
    const char   *path
    int buffer_size
  );
  ~TsFileReader();                   //Destructor
  char *getnext();                   //Read next data
};
class TsFileWriter                   //Writes lines in a fiie
{
  TsFile    *f;
  enum {NEW, APPEND};
  TsFileWriter(                      //Constructor
    const char *path,
    int    new_or_append
  );
  ~TsFileWriter();                   //Destructor
  int putnext(char *buffer);         //Write next data
  int putnewline();                  //Write a new line character
};
class TsDataReader
{
  Singly_linked_list(TsStr)          datalist;
  TsDataReader();                    //Constructor
  ~TsDataReader();                   //Desructor
  void loadfile(const char *path);   //Load a file into list
  Singly_linked_list(TsStr)& getlist();  //Read in the list
  void print();                      //Print the list
};
class TsDataWriter
{
  Singly_linked_list(TsStr)          datalist;
  TSDataWriter();                    //Constructor
  ~TsDataWriter();                   //Destructor
  void setlist(Singly_linked_list(TsStr)& L);  //Organize list for
                                               writing
  void dumpfile(const char *path):   //Output file list
  void print();                      //Print the list
};
```

As for the neutral data file NDF, its format makes it possible to store a model sequentially. The file NDF can represent models in the form of a neutral information model NIM or a tool metamodel. The file NDF makes it possible to save the classes, the objects, the properties and the coordinates of the lines of the representation of a model with the property values.

The objects of the mechanism D (called dynamo objects) have write functions in the file NDF which make it possible to store a model. The capability for editing files NDF on request is useful for generating test data. The format NDF has proven useful for evaluating the results during test executions. Gateway developers can use files NDF to save or evaluate results and continue or restart tests at various intermediate points during the gateway operation.

Input file register for syntactic analysis of text.

```
class TsBuffer
{
  char* buf;     //register pointer
  char* cp;      //position of the current character
  int bufSize;   //register capacity
  int lineNbr;   //current line number in the input file
  int indent;    //spaces and/or tabs (1 mod 8) counted
                     as spaces
  int rescan;    //1: reading jump, uses same register
                     contents
  FILE* fd;      //file opened by constructor
  TsBuffer(const char* aFilePath, int aLen = 256);
  ~TsBuffer(){delete[] buf;}
    Matching the text and a value at the current position of
    the register, pointer progression
  int TSBuffer::match(const char* v)
    Test for comment line
  int TsBuffer::isComment()
    Scan for indents, adjustment of tabs
  int TsBuffer::scanIndent()
    Text line reading, comment lines not recognized, count of
    indents, setting of margins \n
  int TsBuffer::readBuf()
    Reading of word delimited by "delim"
  char* TSBuffer::getWord(char delim)
    Scan for a decimal value, return of a value in integer
    form, cursor progression
  int TsBuffer::scanDec()
```

Reading of a model NDF, construction of a dynamo object

```
class TSReadNDF : register TsBuffer protected
{
  TsStr    metaModelName;
  TsStr    modelName;
  TsStr    objName;
  int      objNdx;
  TsStr    propName;
  int      lineNbr;
  char*    value;
  TsDynamo* dyn;
  TsoBJ*   at;
  int status;
  TsReadNDF(const char* aFileName);
};
```

Reading of file NDF and loading of dynamo object

The constructor is the entire algorithm.

```
TsReadNDF::TsReadNDF(cost char* aFileName) : TsBuffer(aFileName)
```

Syntax of the file NDF

In the syntax of the file NDF, the indent indicates a nest. The comment lines begin with "*".

Metamodel of the file NDF

The following format of the file NDF makes it possible to specify a metamodel, a model, and the objects, properties, values and links which constitute a model.

```
*NDF rev 1.0                          //comment line for identifying the
                                        file
MetaModelName: metaModelName          //Name of the metamodel
  required for reading the model
Model: modelName                      //Create a dynamo object (model
  metamodel name)
Object: Class, ObjNdx                 //Create an object (class,
                                        indexObjNdx)
propld: value                         //Set single value property
propsym:                              //Set multiple values in the array or
                                        block
  propNdx: value...                   //One value per line
Link: lnkName,lnkNdx                  //Create link (name and index of
link)
FROM: Class, objNdx                   //Set endpoint
TO: Class, objNdx                     //Set endpoint
// The file "metamodelName.mta" supplies the metamodels of the
neutral information model NIM, PX8, etc.
// Therefore, the structure is not present in the file
"modelName.ndf".
//Example:
* NDF rev 1.0
MetaModelName: nim
Model: ndfsample
Object: BEN,1
TITLE: My Object X
NOTES:
1: %PX8_CODE myobjx
2: %PX8_NAME My Object X
Object BEN,2
TITLE: another obj
NOTES:
1: %PX8_CODE nother
2: %PX8_NAME another obj
Object: ATT,1
DATY: DATE
NOTES:
1: %PX8_CODE bdate
2: %PX8_NAME birthdate
```

```
PIC.: YY MM-DD
SIZE: 8
TITLE: birthdate
Link: BEN1,1
FROM: BEN,2
TO: ATT,1
```

In conclusion, the preceding description of the process for manipulating data models according to the invention, due to the utilization of an executed language (for example of the C++ type) for the construction of gateways instead of a proprietary interpreted language, shows the advantageous technical effects of this process, which is designed to be applied to a new technology allowing the interoperability of a plurality of software engineering tools. Not only can any tool be easily represented by the neutral information model offered, but also any internal model representation can be implemented, allowing a user to retain his own information model for the internal representation of his development data or to use any of the industry standards such as, for example, the data exchange format (CDIF) designed for the various software engineering tools (CASE) associated with a common repository. The process takes full advantage of the characteristic of code reusability, thus making it possible to meet the lead time requirements for gateways of this type, while the development time and cost of these gateways are also quite significantly reduced because the code libraries are reusable. Likewise, it offers a substantial simplification of any procedure for adding new gateway components in order to change and finely adapt a model transfer process to a client's specific needs. Performance is improved considerably due to the fact that the present process can be considered to be the application of a simple and unique executable.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A process for manipulating data models for the transfer of said data models among a plurality of software engineering tools having an initial format and for the application of transformation rules to one said model, transforming the data models by means of gateways to convert the initial format of one tool into a format of another tool by passing the initial format through a unique neutral intermediate format, developing the gateways, in accordance with an object-oriented approach, in an executed language, the gateways being executable which allow the transformation of a data model in several steps, activating the steps successively, in a systematic or conditional way, using a command language which describes a logic for dynamic concatenation of the steps, concatenation being a named, parameterized procedure, each step being an executable whose code is developed from an array of reusable classes, and providing the name and the parameters of the corresponding procedure to be activated.

2. The process for manipulating data models according to claim 1, characterized in that in order to develop a gateway, a reusable class is created which makes it possible to represent models and metamodels stored in memory in a repository or in an external file, using a dynamic allocation of the modeling objects, the objects of said class integrating an array of memory structures and supplying functions for manipulating the data of a model loaded into memory.

3. The process for manipulating data models according to claim 1, characterized in that in order to develop a gateway, a reusable class is created which makes it possible to code and decode different tool export file formats, which reusable class encapsulates the tool export records and is used to describe the record formats of an import file, whereas upon initialization, while a metamodel of a tool is read with the aid of the class for representing the models and metamodels sorted in memory from a text file, the code of the gateway makes it possible to read the tool export file, to access the member fields of the records and to create the objects and their properties using the functions of the class for representing the models and metamodels stored in memory.

4. The process for manipulating data models according to claim 1, characterized in that in order to develop a gateway, a reusable class is created for manipulating character strings, making it possible to handle allocations, concatenations and comparison operators with the substring and dynamic memory reallocation functions while preserving compatibility with the character strings of a C-type language.

5. The process for manipulating data models according to claim 2, characterized in that in order to develop a gateway, a reusable class is created which makes it possible to code and decode different tool export file formats, which reusable class encapsulates the tool export records and is used to describe the record formats of an import file, whereas upon initialization, while a metamodel of a tool is read with the aid of the class for representing the models and metamodels sorted in memory from a text file, the code of the gateway makes it possible to read the tool export file, to access the member fields of the records and to create the objects and their properties using the functions of the class for representing the models and metamodels stored in memory.

6. The process for manipulating data models according to claim 2, characterized in that in order to develop a gateway, a reusable class is created for manipulating character strings, making it possible to handle allocations, concatenations and comparison operators with the substring and dynamic memory reallocation functions while preserving compatibility with the character strings of a C-type language.

7. The process for manipulating data models according to claim 3, characterized in that in order to develop a gateway, a reusable class is created for manipulating character strings, making it possible to handle allocations, concatenations and comparison operators with the substring and dynamic memory reallocation functions while preserving compatibility with the character strings of a C-type language.

8. The process for manipulating data models according to claim 5, characterized in that in order to develop a gateway, a reusable class is created for manipulating character strings, making it possible to handle allocations, concatenations and comparison operators with the substring and dynamic memory reallocation functions while preserving compatibility with the character strings of a C-type language.

9. A process for manipulating data models for the transfer of said data models among a plurality of software engineering tools having an initial format and for the application of transformation rules to one of said models, comprising developing gateways for transformation of data models and conversion of the initial format of one tool into a format of another tool, passing the initial format through a unique neutral intermediate format, carrying out the development of the gateways in an executed language and in accordance with an object-oriented approach, the gateways being executable, transforming a data model in several steps activated successively, in a systematic or conditional way, dynamically concatenating the steps using a command language which describes a logic for concatenation, concatenation being a named, parameterized procedure, each step being an executable whose code is developed from an array of reusable classes, and supplying the name and the parameters of the procedure to activate the procedure.

10. The process for manipulating data models according to claim 9, wherein to develop a gateway, a reusable class is created to represent models and metamodels stored in memory in a repository or in an external file, using a dynamic allocation of the modeling objects, the objects of said class integrating an array of memory structures and supplying functions for manipulating the data of a model loaded into memory.

11. The process for manipulating data models according to claim 10, wherein to develop a gateway, a reusable class is created to code and decode different tool export records, which reusable class encapsulates the tool export records and is used to describe the record formats of an import file, whereas upon initialization, while a metamodel of a tool is read with the aid of the class for representing the models and metamodels sorted in memory from a text file, the code of the gateway makes it possible to read the tool export file, to access the member fields of the records and to create the objects and their properties using the functions of the class for representing the models and metamodels stored in memory.

12. The process for manipulating data models according to claim 10, characterized in that in order to develop a gateway, a reusable class is created for manipulating character strings, making it possible to handle allocations, concatenations and comparison operators with substring and dynamic memory reallocation functions while preserving compatibility with the character strings of a C-type language.

* * * * *